United States Patent [19]

Smetters

[11] Patent Number: 5,261,449
[45] Date of Patent: Nov. 16, 1993

[54] QUICK CHANGE COUPLING FOR TILTED DISC CHECK VALVE WITH TOP MOUNTED DASHPOT

[75] Inventor: Robert Smetters, Schaumburg, Ill.

[73] Assignee: Val-Matic Valve and Manufacturing Corp., Elmhurst, Ill.

[21] Appl. No.: 883,396

[22] Filed: May 15, 1992

[51] Int. Cl.$^5$ ............................................. F16K 15/03
[52] U.S. Cl. ........................................ 137/514; 403/310
[58] Field of Search ............... 137/514, 527, 522, 523; 403/310; 251/58

[56] References Cited

U.S. PATENT DOCUMENTS

| | | | |
|---|---|---|---|
| 34,769 | 3/1862 | Northrup | 403/310 |
| 627,049 | 6/1899 | Cash | 137/514 |
| 1,916,738 | 7/1934 | Miller et al. | |
| 2,067,271 | 1/1937 | Johnson | 403/310 |
| 2,108,234 | 2/1938 | Raymond | |
| 2,706,997 | 4/1955 | Moody | |
| 3,253,610 | 5/1966 | Pahl et al. | |
| 3,353,979 | 11/1967 | Simonetti | |
| 3,648,718 | 3/1972 | Curran | |
| 3,785,611 | 1/1974 | Di Sabatino, Jr. | |
| 3,789,872 | 2/1974 | Elliott | |
| 3,809,114 | 5/1974 | Mueller et al. | |
| 3,942,551 | 3/1976 | Schuller et al. | |
| 4,616,477 | 10/1986 | Baumeler | |
| 4,669,500 | 6/1987 | Strelow | |

Primary Examiner—Robert G. Nilson
Attorney, Agent, or Firm—Hill, Steadman & Simpson

[57] ABSTRACT

A quick change coupling arrangement for holding an actuator shaft of a hydraulic dampening unit to a valve shaft of a swing check valve. The coupling arrangement provides knob portions arranged on opposing free ends of the valve shaft and the actuator shaft, which are captured in sandwich fashion between two semi-circular cylindrical shell connectors. An outer sleeve is provided which can be temporarily displaced upward on the actuator shaft during assembly of the shell sections over the knob portions and then slid downward to cover the shell sections and hold the shell connectors together preventing radial departure from the knob portions. A set screw is provided to hold the sleeve in axial fixation with one of the shell connectors.

20 Claims, 2 Drawing Sheets

QUICK CHANGE COUPLING FOR TILTED DISC CHECK VALVE WITH TOP MOUNTED DASHPOT

BACKGROUND OF THE INVENTION

The present invention relates to valves which have an external actuator shaft connected to a valve closure element, in particular, to a tilted disc check valve having a top mounted hydraulic cylinder which is shaft connected to a tilted disc located within a body of the valve.

U.S. Pat. Nos. 4,669,500; 3,789,872; 3,942,551; and 3,785,611 all disclose a check valve which utilizes external shaft connected actuators to influence the movement of a check valve disc. Previously, in a top mounted dashpot arrangement for a check valve, if the dashpot is to be replaced or if any portion of the valve is to be repair, complete disassembly of the structure has been required. A quick replacement of a hydraulic cylinder from the other top mounted dashpot components, for repair or replacement, without having to first remove the tilted disc check valve from the pipeline is desireable.

Shaft couplings for valve applications other than check valves are known. U.S. Pat. No. 2,108,234 discloses a stem coupling for attaching adjacent ends of two stems. The mating sections of the coupling are held together by a bolt extending therethrough. U.S. Pat. No. 3,648,718 discloses an assembly for joining a valve actuator shaft with a valve stem. A connector block is used which is internally threaded and formed of two collar pieces which are bolted together and held firm by a jamb nut. U.S. Pat. No. 3,253,610 shows a connecting element having a pair of clamping jaws bolted together and having internal threads therein.

U.S. Pat. Nos. 3,353,797; 2,706,997; and 4,616,477, show coupling arrangements engaged to shafts.

SUMMARY OF THE INVENTION

The present invention concerns an improved shaft coupling arrangement for a valve, particularly for a tilted disc check valve having a top mounted dashpot arrangement shaft connected to the tilted disc. If the hydraulic cylinder is to be replaced or any portion of the valve is to be repaired, complete disassembly of the structure is not required. The unique coupling allows for easy removal of a hydraulic cylinder from other dashpot components, for repair or replacement, without having to first remove the check valve from the pipeline, thus saving maintenance costs and down time.

The coupling is capable of taking full compressive and tension forces developed by the check valve during the opening and closing cycle.

Due to the inventive assembly of the coupling, critical alignment is eliminated as was heretofore required between the hydraulic cylinder rod (actuator shaft) and the connecting rod (valve shaft), when the hydraulic cylinder rod was coupled by threading to the connecting rod. Previously, if the alignment between these two rods, and the other dashpot components was not perfect, the dashpot assembly would bind or additional frictional forces would be added to the operation of the dashpot assembly.

According to the invention, the shaft between the dashpot and the check valve is provided with a slip-over sleeve enclosing a pair of fitted together semi-circular cylindrical segments, each having machined shoulders on the interior surface thereof for cooperatively seating and engaging corresponding shoulders on the joining shaft parts.

The invention provides an effective arrangement for coupling any valve including control valves, motor operated valves, gate valves, or the like. According to the invention, opposing actuator shaft and valve shaft provide reduced diameter sections extending into disc-shaped knob portions. The knob portions are arranged closely adjacent. The inventive coupling particularly uses two semi-circular cylinder sections having a grooved formation therein to capture in sandwich fashion the knob portions of the shafts to be joined. An outer cylindrical sleeve, which can be transported upward along one of the shafts until needed, can be slid down over the cylindrical sections, holding the cylindrical sections together in place, binding the facing knob portions of the shaft. A single set screw can be used to attach the outer sleeve to one of the cylinder sections which holds the entire assembly fixed.

In another embodiment of the invention, particularly for an orientation wherein the actuator shaft and valve shaft are arranged vertically, the outer sleeve can be sized with an inside diameter greater than the actuator shaft providing a clearance between an outside diameter of the actuator shaft and the inside diameter of the outer sleeve. The outer sleeve further provides on a top end thereof an inwardly directed annular lip which conforms closely to the outside diameter of the actuator shaft. The coupling cylindrical sections are sized having an outer diameter (when assembled) greater than the actuator shaft but still less than the inside diameter of the outer sleeve. This arrangement allows for the outer sleeve to slide down around the cylindrical sections when assembled, with the inwardly directed annular lip resting on a top annular edge of the cylindrical sections exposed around the actuator shaft. Due to this arrangement, the outer sleeve cannot fall downwardly below the cylindrical sections and therefore rests in place, held by gravity. In this arrangement, the set screw can conceivably be eliminated, thus reducing further still the number of parts required to hold the coupling in place.

By using the inventive construction, a lightweight, effective coupling arrangement is created, saving weight and cost to manufacture a valve. By contrast, where the prior art used a coupling assembly for capturing ends of a shaft, such as U.S. Pat. No. 2,108,234 or U.S. Pat. No. 3,648,718, a comparatively heavy coupling block using two half coupling blocks with through bolts was used. This structure does not have the lightweight advantage of the present invention. Additionally, considerably more labor is involved to remove two or more bolts than to simply remove one set screw and slide the sleeve to clear the coupling half cylinders. It is also foreseen that coupling blocks using a plurality of bolts are more susceptible to a loosening of the coupling due to loosening of the bolts because of vibrations in use. The present invention in one embodiment utilizes only one set screw, and in another embodiment wherein the sleeve is arranged in vertical orientation, no screwed connecting elements are required at all.

DETAILED DESCRIPTION OF THE PREFERRED EMBODIMENTS

Figure 1:
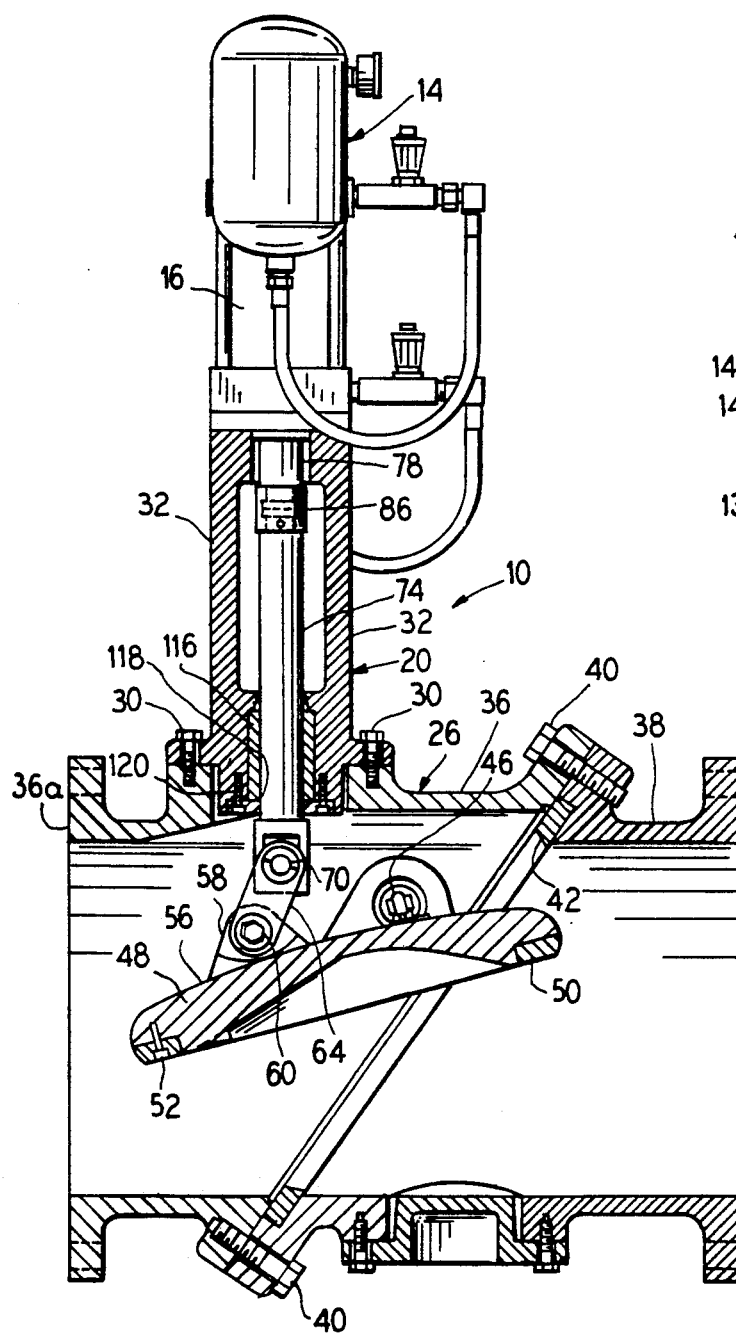
FIG. 1 is a partial sectional view of a swing check valve having top dashpot mounted components.

FIG. 1 shows a check valve assembly generally at 10 comprising a hydraulic dashpot assembly 14 including a hydraulic cylinder 16. Hydraulic dashpot assemblies for swing check valves are known such as in U.S. Pat. Nos. 3,709,872; 3,942,551; 4,669,500 and 3,785,611. The cylinder and dashpot arrangement is mounted on top of a stand 20 which itself is bolted in sealed fashion to a valve body 26 by bolts 30. The stand 20 comprises a plurality of vertical legs 32.

The valve body 26 comprises an annular main body 36 bolted to an annular secondary body 38 by a circular pattern of bolts 40. The main body can terminate in a bolting flange, welding neck, screwing threads, or other connection at end 36a, a flanged connection shown. The secondary body can terminate in a bolting flange, welding neck, screwing threads or other connection at end 38a, a flanged connection shown. Pinched between the main body 36 and the secondary body 38 is a valve seat 42. Pivotally mounted within the main body 36 via a pin 46 is a swing disc 48 which, when swung about the pin 46 counterclockwise according to FIG. 1, seats peripherally around the valve seat 42 to close the main body 36 from the secondary body 38. A select material seal ring 50 can be arranged around a periphery of the swing disc 48, attached by screws 52, to increase sealing and/or increase wear life between the swing disc 48 and the valve seat 42.

On a backside 56 of the swing disc 48 is mounted a lug 58 held by a pin 60 to a connector plate 64, at a first end of the connector plate 64. At a second end of the connector plate 64, a pin 70 connects the connector plate 64 to a valve shaft 74. Both the pin 60 and the pin 70 provide pivotal connections.

The dashpot assembly 14 provides an actuator shaft 78 proceeding downward from the cylinder 16. The presently preferred material for use in constructing the actuator shaft is 17-4 Ph stainless steel which has the corrosion protection required to withstand the elements of outdoor applications and the high humid conditions found in pump house applications. The actuator shaft 78 is connected inside the cylinder 16 to a piston 80 (see FIG. 2). The piston 80 reciprocates in the cylinder 16 under influence of the hydraulic fluid therein to dampen swinging of the swing disc 48 through the influence of the actuator shaft 78 transferred down through the valve shaft 74.

To connect the actuator shaft 78 to the valve shaft 74, a coupling 86 is provided as will be described hereinafter.

Figure 2:
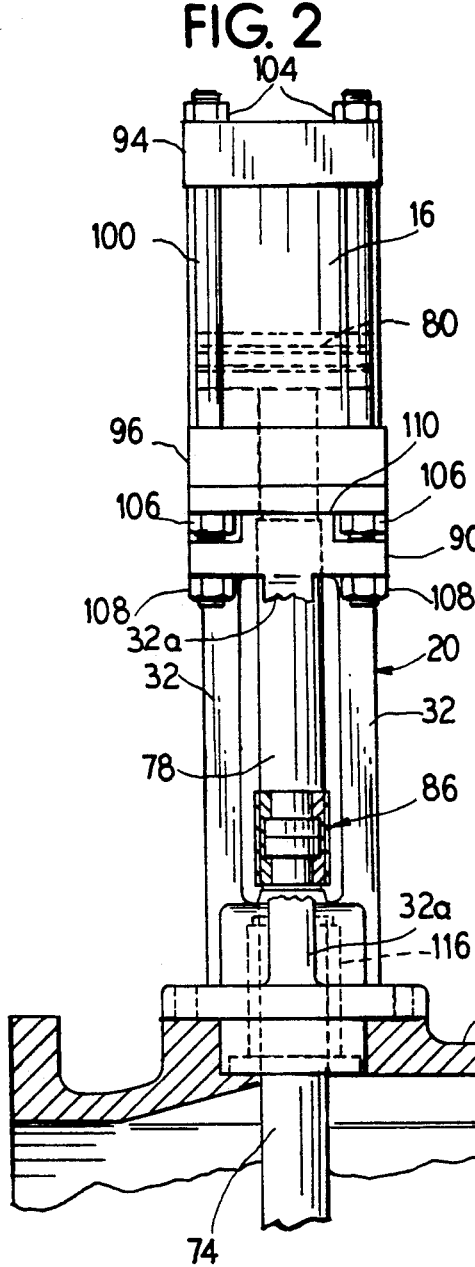
FIG. 2 is a partial sectional view of the valve assembly of FIG. 1.
Figure 3:
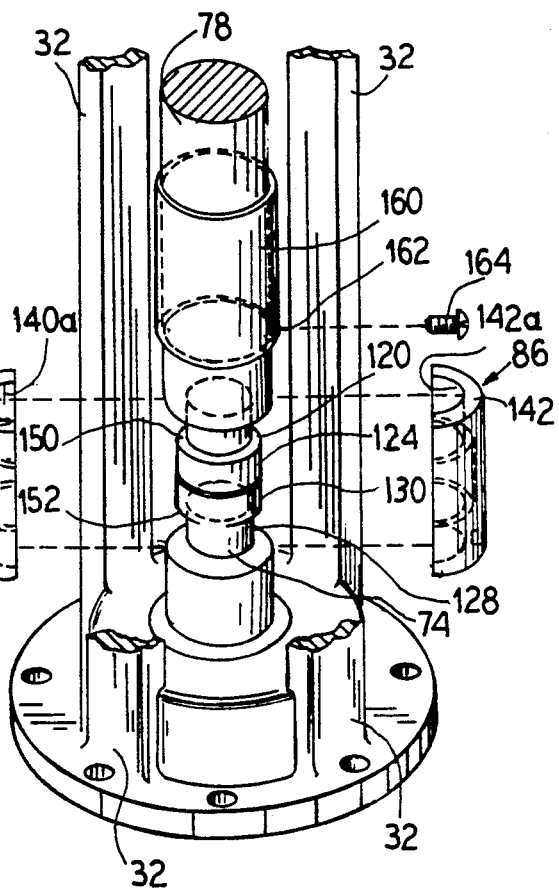
FIG. 3 is a fragmentary perspective view of a top mounted shaft assembly of FIG. 2.

FIG. 2 shows in more detail the attachment of the hydraulic cylinder 16 to the stand 20. FIG. 2 and FIG. 3 show that four legs 32 are utilized, although two legs can be used or any other number of legs which effectively support the dashpot assembly. One of the legs 32, a leg 32a, is shown partially removed for clarity. The legs 32 support at a top end thereof a platform 90 having bolt holes arranged therethrough. The cylinder 16 is clamped between a top plate 94 and a bottom plate 96 by a plurality of studs 100 having threaded end regions. The studs 100 hold the top plate 94 via a plurality of nuts 104. The bottom plate 96 is held against a bottom of the cylinder 16 by nuts 106. The studs 100 proceed continuously downward through the nuts 106 and have sufficient length to pass through the platform 90, particularly through the bolt holes arranged therethrough, and hold nuts 108 tightly against an underside of the platform 90, abutting the platform 90 at a top end 110 thereof against the bottom plate 96. The actuator shaft 78 proceeds into the cylinder 16 in sealed fashion as is known. The valve shaft 74 proceeds upward through a bushing 116 as shown in FIG. 1. A retaining plate 118 can be mounted with bolts 120 to hold the bushing in place. The bushing 116 can be provided with O ring seals (not shown) around its inner and outer diameter for sealing against fluid leakage at the shaft penetration into the valve body 26.

FIG. 3 shows the coupling in more detail. The actuator shaft 78 provides at its free end a reduced diameter section 120 followed by a knob portion such as a disc portion 124, both in axial alignment with the shaft 78. The valve shaft 74 provides a reduced diameter section 128 followed by a knob portion such as a disc portion 130. The disc portion 130 and the reduced diameter section 128 are in axial alignment with the valve shaft 74. The valve shaft 74 is in substantial axial alignment with the actuator shaft 78.

The coupling provides two shell connectors 140, 142 which substantially form half sections of a circular cylinder. The shell connectors 140, 142 have an outer diameter, when brought together, which is approximately equivalent to an outer diameter of either the actuator shaft 78, the valve shaft 74 or both. The shell connectors 140, 142 have contoured inner surfaces 140a, 142a respectively, that conform closely around the reduced diameter sections 120, 128 and the disc portions 124, 130. Because the disc portions have a larger diameter than the reduced diameter sections, shoulder portions 150, 152 are formed thereon which, overlain by the inside surfaces 140a, 142a create an interference which prevents axial separation of the actuator shaft 78 from the valve shaft 74.

Shown temporarily displaced upward along an axis of the actuator shaft 78, is a sleeve 160. The sleeve 160 provides at least one hole 162 for insertion of a screw 164 therethrough.

Figure 4:
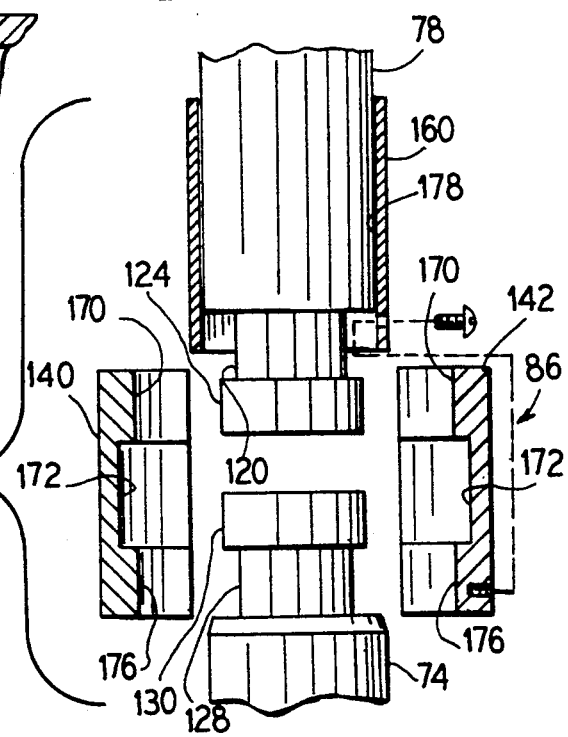
FIG. 4 is an exploded view of a shaft coupling of the present invention.

FIG. 4 shows in more detail the coupling arrangement 86. The shell connectors 140, 142 have a first cylinder bore 170 having a diameter slightly greater than the reduced diameter sections 120. A cylindrical bore section 172 in the shell connectors 140, 142 has a inside diameter slightly greater than an outside diameter of the disc portions 124, 130. A bottom cylindrical bore section 176 of the shell connectors 140, 142 has an inside diameter slightly larger than the reduced diameter section 128. The sleeve 160 fits over the actuator shaft 78 and has an inside diameter 178 which is slightly greater than an outside diameter of the shell connectors 140, 142 when mounted onto the shafts 78, 74. It is to be noted that the sleeve 160, instead of being slid upwardly onto the actuator shaft 78 to clear the coupling 86, could just as well be arranged to slide downward on the valve shaft 74 to clear the coupling 86.

Figure 5:
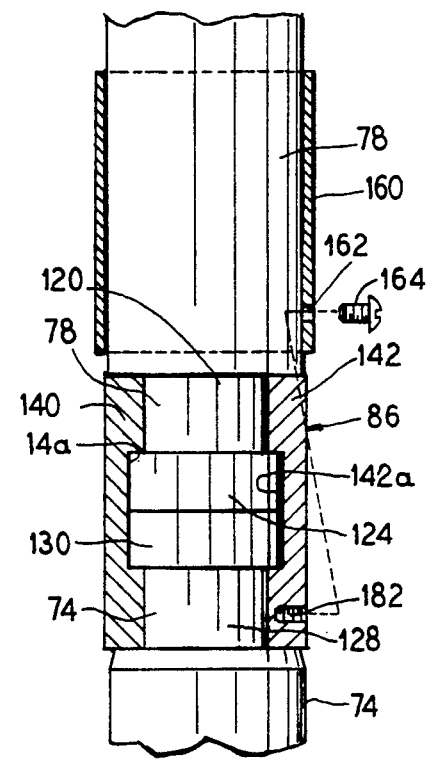
FIG. 5 is a partial sectional view of the coupling assembly of FIG. 4 in partially assembled condition.

FIG. 5 shows the shell connectors 140, 142 mounted to the shafts 78, 74, with the shell connectors 140, 142 shown in section and the shafts shown in elevation. The inside surfaces 140a, 142a can be adapted to provide some amount of clearances around the disc portions 124, 130 and/or the reduced diameter sections 120, 128 to provide play in the coupling 86 to compensate for any misalignment of the shafts 78, 74. This is an improvement over the prior art shafts which use screwed couplings which require a higher degree of precision and alignment. Once the sleeve 160 is slid down over the shell connectors, 140, 142 the screw 164 can be placed through the hole 162 and threaded into a threaded bore 182 in the shell connector 142. The screw 164, by protruding outwardly of the shell connector 142 into the hole 162, prevents axial sliding of the sleeve 160 with respect to the coupling connector 142 which thus prevents radial separation of the shell connectors 140, 142 by interference with an inside diameter of the sleeve 160.

This coupling arrangement provides for a quick disassembly of the hydraulic cylinder from the valve body and stand. If the dashpot is to be replaced or other portion of the dashpot assembly is to be repaired, more extensive disassembly of the structure has been required in the prior art. According to the invention, a quick change coupling is achieved wherein the shaft ends, between the dashpot and the check valve, are provided with the coupling arrangement 86 of the invention.

For disassembly, the screw 164 is withdrawn from the threaded bore 182 and the hole 162. Access to the screw and the coupling is made in between the legs 32 of the stand 20. The sleeve 160 is then withdrawn axially upward onto the actuator shaft 78 to clear the shell connectors 140, 142. The shell connectors 140, 142 can then be withdrawn radially away from the shaft 78, 74. The shafts are thereby mechanically disconnected. The nuts 108 can be unscrewed which allows the cylinder 16, the top plate 94, the bottom plate 96, the studs 100 and the nuts 104, 106 to be withdrawn upward with the actuator shaft 78 as a unit. The studs are withdrawn upward through the bolt holes provided in the platform 90. In practice, the couplings and outer sleeve are initially placed or removed from a top side access hole provided in the platform 90 when the top plate 94, the bottom plate 96 are withdrawn with the actuator shaft 78 as a unit. This has been found especially practical when the clearance between the legs 32 is to narrow to place these components therethrough for assembly.

Figure 6:
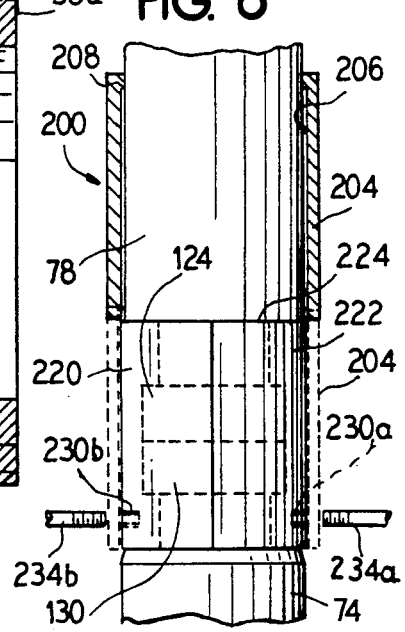
FIG. 6 is an elevational view of another embodiment of the coupling and sleeve of FIG. 5.

Another shaft coupling arrangement 200 is shown in FIG. 6. In this arrangement, an outer sleeve 204 is provided having an annular clearance 206 between an inside diameter of the sleeve 204 and an outside diameter of the actuator shaft 78. The outer sleeve 204 further provides on a top end, an annular lip 208 which proceeds inwardly from the outer sleeve 204 to conform more closely to the outside diameter of the shaft 78. A left shell connector 220 and a right shell connector 222 are provided, similar to the shell connectors, 140, 142 of FIG. 5 except sized to have an outer diameter greater than the actuator shaft 78, but less than an inside diameter of the outer sleeve 204. Thus, when the shell connectors 220, 222 are assembled together as shown in FIG. 6, the outer sleeve 204 can be slid down thereover, as described above with respect to FIG. 5, except that the annular lip 208 will now seat on a top annular edge 224 of the shell connectors 220, 222 as shown dashed in FIG. 6.

Also shown in FIG. 6 is threaded bore 230a in right shell connector 222, and threaded bore 230b in left shell connector 220. These threaded bores 230a, 230b can provide the assembly function as described in FIG. 5 for attaching the outer sleeve 204 to one of the bores 230a, 230b to axially retain the outer cylinder in place. However, advantageous to the embodiment of FIG. 6, if the valve shaft 78 is arranged in a vertical orientation, gravity will hold the outer sleeve 204 in place axially thus potentially eliminating the screw as a necessary part. However, of course, the screw can be installed as an additional measure of assembly security.

Additionally, by providing threaded bores 230a, 230b in both shell connectors, threaded handling rods 234a, 234b can be utilized as a tool in assembling the coupling. By referring to FIG. 3, it can be seen that manipulation of the coupling between the legs 32 requires much manual dexterity in order clear the shell connectors away from the disc portion 124 in order to disassemble and lift the actuator shaft 78 upward from the valve shaft 74. By providing the handling rods 234a, 234b which can be temporarily screwed into the bores 230a, 230b of the shell connectors 220, 222, or the shell connectors 140, 142 of FIG. 5, these rods 234a, 234b can proceed outwardly through and in between the legs 32 to be effectively manipulated by an assembler or disassembler of the valve. The rods 234a, 234b can be provided with gripping handles similar to a screwdriver or can merely be plain threaded rods cut to an appropriate length.

Although the present invention has been described with reference to a specific embodiment, those of skill in the art will recognize that changes may be made thereto without departing from the scope and spirit of the invention as set forth in the appended claims.

I claim as my invention:

1. In a check valve having a body holding a check valve disc therein, and having a shaft piercing the body and connected to the disc, the shaft externally communicating with an actuating shaft of a hydraulic influencing unit, the improvement comprising:

a first knob portion formed on a free end of said actuator shaft;

a second knob portion formed on a free end of said valve shaft, said first knob portion and said second knob portion arranged to be brought in close proximity; and a coupling means for surrounding said first and said second knob portion and holding said first and said second knob portion in fixed proximity:

wherein said coupling means comprises a first cylindrical shell section and a second cylindrical shell section, said first cylindrical shell section and said second cylindrical shell section having inside surfaces conforming to surround said first and said second knob portions, and said coupling means comprises a sleeve, said sleeve positionable around said first shell section and said second shell section to hold said shell sections radially together, to remain engaged with said first and second knob portions; and wherein said first shell section and said second shell section provide an end portion having an abuttable surface thereof, said sleeve sized to have an inside diameter to pass over said abuttable surface when slid from a retracted position on said one of said actuator shaft and said valve shaft to a position around said first shell section and said second shell section, said sleeve further providing an inwardly directed member aligned to abut said abuttable surface when said sleeve is completely slid over said first shell section and said second shell section.

2. In a check valve having a body holding a check valve disc therein, and having a shaft piercing the body and connected to the disc, the shaft eternally communicating with an actuating shaft of a hydraulic influencing unit, the improvement comprising;
- a first knob portion formed on a free end of said actuator shaft;
- a second knob portion formed on a free end of said valve shaft, said first knob portion and said second knob portion arranged to be brought in a close proximity;
- a coupling means for surrounding said first and said second knob portion and holding said first and said second know portions in fixed proximity;
- wherein said coupling means comprises a first cylindrical shell section and a second cylindrical shell section, said first cylindrical shell section and said second cylindrical shell section having inside surfaces conforming to surround said first and said second knob portions;
- and said coupling means comprises a sleeve, said sleeve positionable around said first shell section and said second shell section to hold said shell sections radially together, to remain engaged with said first and second knob portions; and
- wherein said first shell section and said second shell section when assembled are sized to have an outside diameter greater than an outside diameter of said actuator shaft but less than an inside diameter of said sleeve, and said sleeve provides an inwardly directed annular lip at a trailing and thereof, said annular lip abuttable against a rim of said first shell section and said second shell section protruding radially outwardly of said actuator shaft when said sleeve is completely slid around said first shell section and said second shell section.

3. In a check valve having a body holding a check valve disc therein, and having a shaft piercing the body and connected to the disc, the shaft externally communicating with an actuating shaft of a hydraulic influencing unit, the improvement comprising:
- a first know portion formed on a free end of said actuator shaft;
- a second knob portion formed on a free end of said valve shaft, said first knob portion and said second knob portion arranged to be brought in close proximity;
- a coupling means for surrounding said first and said second knob portion and holding said first and said second knob portions in fixed proximity;
- wherein said coupling means comprises a first cylindrical shell section and a second cylindrical shell section, said first cylindrical shell section and said second cylindrical shell section having inside surfaces conforming to surround said first and said second know portions; and
- wherein said shell sections, when engaged around said knob portions are defined by an outside diameter equal to an outside diameter of said actuator shaft.

4. A coupling element for a valve having a valve body having a flow through port therein and a closure element for changing a restriction of the flow port, the closure element mechanically communicating through a valve shaft which pierces through said valve body in sealed fashion, the vale shaft arranged in axial alignment with an actuator shaft, the actuator shaft mechanically communicating to an actuator which influences the opening and closing of the closure element of the valve, the actuator shaft and the valve shaft mechanically coupled by said coupling, comprising:
- a first knob portion formed on a free end of said actuator shaft;
- a second knob portion formed on a free end of said valve shaft, said first knob portion and said second knob portion arranged to be brought in close proximity;
- a first cylindrical shell section having a partial circular outside perimeter and a second cylindrical shell section having a partial circular outside perimeter, said first cylindrical shell section and said second cylindrical shell section arranged at least partially radially surrounding said first and second knob portions, and said first and second cylindrical shell sections having inside surfaces adapted to at least partially axially capture said first and second knob portions together to prevent axial separation of said first and second knob portions; and
- boltless means for radially retaining said first and second cylindrical shell sections with respect to said first and second knob portions, without exerting significant compression force on the first and second cylindrical shell sections.

5. The coupling according to claim 4, wherein said means for radially retaining comprises a cylindrical sleeve having an inside diameter slightly larger than an outside diameter of said cylindrical shell sections assembled together, said cylindrical sleeve freely overfitting said cylindrical shell sections.

6. The coupling according to claim 5, wherein said cylindrical sleeve comprises a circular outside perimeter.

7. The coupling according to claim 4, wherein said first knob portion comprises an end region having a reduced diameter section terminating in an increase diameter disc section and said second knob portion comprises a second end region having a second reduced diameter section terminating in a second increased diameter disc section, said first disc section and said second disc section in facing relation.

8. The coupling according to claim 7, wherein said first cylindrical shell section and said second cylindrical shell section together comprise a first axial region having a first bore diameter between the shell sections slightly greater than said first reduced diameter section, and a second axial region having a second bore diameter between shell sections slightly greater than said first and second increased diameter disc sections, and a third axial region having a third bore diameter between shell sections slightly greater than said second reduced diameter section, said first, second and third axial regions aligned axially to overfit said first reduced diameter section, said first and second increase diameter disc sections and said second reduced diameter sections respectively, closely conforming thereto.

9. The coupling according to claim 4, wherein said means for radially retaining comprises a cylindrical sleeve having an inside diameter slightly larger than an outside diameter of said cylindrical shell sections assembled together, said cylindrical sleeve freely overfitting said cylindrical shell sections, and a set screw, and said sleeve and one of said shell sections provide alignable bores, said set screw arranged to penetrate said bores in both said sleeve and said one of said cylindrical shell sections preventing axial displacement of said sleeve with respect to said shell section.

10. A coupling element for a valve having a valve body having a flow through port therein and a closure element for changing a restriction of the flow port, the closure element mechanically communicating through a valve shaft which pierces through said valve body in sealed fashion, the valve shaft arranged in axial alignment with an actuator shaft, the actuator shaft mechanically communicating to an actuator which influences the opening and closing of the closure element of the valve, the actuator shaft and the valve shaft mechanically coupled by said coupling, comprising:
- a first knob portion formed on a free end of said actuator shaft;
- a second knob portion formed on a free end of said valve shaft, said first knob portion and said second knob portion arranged to be brought in close proximity;
- a first cylindrical shell section and a second cylindrical shell section, said first cylindrical shell section and said second cylindrical shell section arranged at least partially radially surrounding said first and second knob portions, and said first and second cylindrical shell sections having inside surfaces adapted to at least partially axially capture said first and second knob portions together to prevent axial separation of said first and second knob portions; and
- means for radially retaining said first and second cylindrical shell sections with respect to said first and second knob portions; and
- wherein said shell sections, when engaged around said knob portions are defined by an outside diameter equal to or less than an outside diameter of said actuator shaft.

11. A coupling element for a valve having a valve body having a flow through port therein and a closure element for changing a restriction of the flow port, the closure element mechanically communicating through a valve shaft which pierces through said valve body in sealed fashion, the valve shaft arranged in axial alignment with an actuator shaft, the actuator shaft mechanically communicating to an actuator which influences the opening and closing of the closure element of the valve, the actuator shaft and the valve shaft mechanically coupled by said coupling, comprising:
- a first know portion formed on a free end of said actuator shaft;
- a second know portion formed on a free end of said valve shaft, said first knob portion and said second knob portion arranged to be brought in close proximity;
- a first cylindrical shell section and a second cylindrical shell section, said first cylindrical shell section and said second cylindrical shell section arranged at least partially radially surrounding said first and second knob portions, and said first and second cylindrical shell sections having inside surfaces adapted to at least partially axially capture said first and second knob portions together to prevent axial separation of said first and second knob portions;
- means for radially retaining said first and second cylindrical shell sections with respect to said first and second knob portions;
- wherein said shell sections provide an end portion having an abuttable surface; and
- wherein said means for radially retaining comprises a cylindrical sleeve having an inside diameter sized to pass over said abuttable surface when slid from a retracted position on said actuator shaft to a position around said first cylindrical shell section and said second cylindrical shell section, said sleeve further providing at a trailing end thereof an inwardly directed member aligned to abut said abuttable surface when said cylindrical sleeve is completely slid over said first cylindrical shell section and said second cylindrical shell section.

12. A coupling element for a valve having a valve body having a flow through port therein and a closure element for changing a restriction of the flow port, the closure element mechanically communicating through a valve shaft which pierces through said valve body in sealed fashion, the value shaft arranged in axial alignment with an actuator shaft, the actuator shaft mechanically communicating to an actuator which influences the opening and closing of the closure element of the valve, the actuator shaft and the valve shaft mechanically coupled by said coupling, comprising:
- a first knob portion formed on a free end of said actuator shaft;
- a second knob portion formed on a free end of said valve shaft, said first knob portion and said second knob portion arranged to be brought in close proximity;
- a first cylindrical shell section and a second cylindrical shell section, said first cylindrical shell section and said second cylindrical shell section arranged at least partially radially surrounding said first and second knob portions, and said first and second cylindrical shell sections having inside surfaces adapted to at least partially axially capture said first and second knob portions together to prevent axial separation of said first and second knob portions;
- means for radially retaining said first and second cylindrical shell sections with respect to said first and second knob portions;
- wherein said shell sections, when engaged around said knob portions are defined by an outside diameter greater than an outside diameter of said actuator shaft; and
- wherein said means for radially retaining comprises a cylindrical sleeve having an inside diameter slightly larger than an outside diameter of said cylindrical shell sections assembled together, and having an inwardly directed member at a trailing end thereof, said cylindrical sleeve overfitting said cylindrical shell sections with said inwardly directed member abutting an annular end surface portion of said shell sections formed by said shell sections overhanging said actuator shaft.

13. The coupling according to claim 12, wherein said inwardly directed member comprises an annular lip.

14. A method for interconnecting an actuator shaft to a valve shaft wherein the actuator shaft communicates mechanical instructions from an actuator, and the valve shaft receives the mechanical instructions and communicates the mechanical instructions to a valve closure element located within a valve body, comprising the steps of:
- providing on said actuator shaft a shoulder surface facing a direction away from said valve shaft;
- providing on said valve shaft a shoulder surface facing in a direction away from said actuator shaft;
- providing an openable cylindrical coupling having arranged on an inside surface thereof a first abutting surface engageable against said first shoulder surface and a second abutting surface engageable against said second shoulder surface;

closing and openable coupling around said actuator shaft and said valve shaft with said first abutting surface overlying said first shoulder surface and said second abutting surface overlying said second shoulder surface to prevent axial retraction of said actuator shaft from said valve shaft;

providing a cylindrical sleeve axially slidable over one of said actuator shaft and said valve shaft, and slidable over said openable coupling;

sliding said cylindrical sleeve over said coupling to radially retain said coupling in a closed condition;

providing that said openable cylindrical coupling has a portion with an exposed surface having a horizontal component;

providing that said cylindrical sleeve provides an inwardly directed member having a surface in abuttable alignment with said exposed surface of said openable coupling when said cylindrical sleeve is slid over said coupling, preventing further sliding of said sleeve past said coupling.

15. The method according to claim 14 comprising the further steps of:

providing a threaded bore in said coupling;
providing a bore in said cylindrical sleeve;
providing a set screw;
after said cylindrical sleeve has been slid over said coupling, inserting said set screw through said bore and threading said set screw into said coupling to axially retain said coupling with respect to said cylindrical sleeve.

16. The method according to claim 14, wherein the step of providing an openable cylindrical coupling is further characterized in that said coupling has a circular outside perimeter;

and the step of providing a cylindrical sleeve is further characterized in the said cylindrical sleeve has a circular inside bore and a circular outside perimeter.

17. A method for interconnecting an actuator shaft to a valve shaft wherein the actuator shaft communicates mechanical instructions from an actuator, and the valve shaft receives the mechanical instructions and communicates the mechanical instruction to a valve closure element located within a valve body, comprising the steps of:

providing on said actuator shaft a shoulder surface facing a direction away from said valve shaft;

providing on said valve shaft a shoulder surface facing in a direction away from said actuator shaft;

providing an openable cylindrical coupling having arranged on an inside surface thereof a first abutting surface engageable against said first shoulder surface and a second abutting surface engageable against said second shoulder surface;

providing that said openable cylindrical coupling comprises two half cylinder sections;

providing a threaded bore in each of said half cylinder sections;

providing a handle rod for engagement with each of said threaded bores;

attaching said threaded handle rods one each into each of said threaded bores;

manipulating said threaded handle rods to position said openable coupling during assembly or disassembly of said coupling;

closing said openable coupling around said actuator shaft and said vale shaft with said first abutting surface overlying said first shoulder surface and said second abutting surface overlying said second shoulder surface to prevent axial retraction of said actuator shaft from said valve shaft;

providing a cylindrical sleeve axially slidable over one of said actuator shaft and said valve shaft, and slidable over said openable coupling;

removing said handle rods before said cylindrical sleeve is slid over said openable coupling during assembly; and sliding said cylindrical sleeve over said coupling to radially retain said coupling in a closed condition.

18. A coupling element for a valve having a valve body having a flow through port therein and a closure element for changing a restriction of the flow port, the closure element mechanically communicating through a valve shaft which pierces through said valve body in sealed fashion, the valve shaft arranged in axial alignment with an actuator shaft, the actuator shaft mechanically communicating to an actuator which influences the opening and closing of the closure element of the valve, the actuator shaft and the valve shaft mechanically coupled by said coupling, comprising:

a first knob portion formed on a free end of said actuator shaft;

a second knob portion formed on a free end of said valve shaft, said first knob portion and said second knob portion arranged to be brought in close proximity;

a first cylindrical shell section and a second cylindrical shell section, said first cylindrical shell section and said second cylindrical shell section arranged at least partially radially surrounding said first and second knob portions, and said first and second cylindrical shell sections having inside surfaces adapted to at least partially axially capture said first and second knob portions together to prevent axial separation of said first and second knob portions; and boltless means for radially retaining said first and second cylindrical shell sections with respect to said first and second knob portions, without exerting significant compression force on the first and second cylindrical shell sections, wherein said boltless means comprises a sleeve slidable over said first and second cylindrical shell sections as assembled onto said first and second knob portions; and a first abutment surface arranged on said sleeve and a second abutment surface arranged on one of said first and second cylindrical shell sections said first and second abutment surfaces arranged to abut together when said sleeve is completely slid into position over said first and second cylindrical shell sections.

19. The coupling according to claim 18, wherein said first and second shell sections have circular outside perimeters and said sleeve comprises a circular inside bore.

20. The coupling according to claim 18, wherein said first abutment surface is arranged on a radially inwardly directed member of said sleeve and said second abutment surface is arranged on a top annular surface of said first and second shell sections.

* * * * *